United States Patent
Noh et al.

(10) Patent No.: US 8,644,227 B2
(45) Date of Patent: Feb. 4, 2014

(54) METHOD FOR TRANSMITTING CONTROL SIGNAL AND METHOD FOR ALLOCATING COMMUNICATION RESOURCE TO DO THE SAME

(75) Inventors: Min Seok Noh, Anyang-si (KR); Seung Hee Han, Anyang-si (KR); Yeong Hyeon Kwon, Anyang-si (KR); Hyun Hwa Park, Anyang-si (KR); Hyun Woo Lee, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 12/444,326

(22) PCT Filed: Oct. 4, 2007

(86) PCT No.: PCT/KR2007/004850
§ 371 (c)(1),
(2), (4) Date: Apr. 3, 2009

(87) PCT Pub. No.: WO2008/041828
PCT Pub. Date: Apr. 10, 2008

(65) Prior Publication Data
US 2010/0027485 A1 Feb. 4, 2010

Related U.S. Application Data

(60) Provisional application No. 60/828,097, filed on Oct. 4, 2006.

(30) Foreign Application Priority Data

Nov. 30, 2006 (KR) .................... 10-2006-0119888

(51) Int. Cl.
*H04W 4/00* (2009.01)

(52) U.S. Cl.
USPC ........... 370/329; 370/342; 370/343; 370/345; 370/436

(58) Field of Classification Search
USPC .......... 370/329, 343, 206, 208, 335; 375/260; 455/63, 422, 70, 101, 522
See application file for complete search history.

(56) References Cited

U.S. PATENT DOCUMENTS 5,909,436 A * 6/1999 Engstrom et al. ............. 370/343
6,504,836 B1 * 1/2003 Li et al. ......................... 370/349

(Continued)

FOREIGN PATENT DOCUMENTS

EP 1505847 A1 2/2005
EP 1531644 A2 5/2005

(Continued)

OTHER PUBLICATIONS

R1-062306 RACH Sequence Extension Methods for Large Cell Deployment (Sep. 1, 2006) http://www.3gpp.org/index.php.*

(Continued)

*Primary Examiner* — Faruk Hamza
*Assistant Examiner* — Tito Pham
(74) *Attorney, Agent, or Firm* — Birch, Stewart, Kolasch & Birch, LLP

(57) ABSTRACT

A method for transmitting a control signal together with RACH transmission and a method for allocation a communication resource for the control signal transmission are disclosed. In allocating a communication resource for a control signal transmission within a transmission unit resource region for performing an RACH transmission, the present invention includes the steps of setting a resource region used for the RACH transmission to a portion of the transmission unit resource region and allocating the control signal transmission resource region unused for the RACH transmission within the transmission unit resource region.

10 Claims, 6 Drawing Sheets

(56) References Cited

U.S. PATENT DOCUMENTS

| | | | |
|---|---|---|---|
| 7,535,882 B2* | 5/2009 | Kim | 370/338 |
| 7,979,071 B2* | 7/2011 | Kishiyama et al. | 455/436 |
| 2004/0203957 A1* | 10/2004 | George | 455/466 |
| 2007/0117563 A1* | 5/2007 | Terry et al. | 455/434 |
| 2007/0149206 A1* | 6/2007 | Wang et al. | 455/450 |
| 2007/0230600 A1* | 10/2007 | Bertrand et al. | 375/260 |
| 2008/0056227 A1* | 3/2008 | Love et al. | 370/343 |
| 2008/0090528 A1* | 4/2008 | Malladi | 455/70 |
| 2008/0139214 A1* | 6/2008 | Sun et al. | 455/450 |
| 2008/0298325 A1* | 12/2008 | Vujcic | 370/336 |
| 2008/0318588 A1* | 12/2008 | Parkvall et al. | 455/452.1 |
| 2009/0247214 A1* | 10/2009 | Cai et al. | 455/550.1 |
| 2010/0226324 A1* | 9/2010 | Lee et al. | 370/329 |
| 2010/0238872 A1* | 9/2010 | Kim et al. | 370/329 |
| 2011/0310837 A1* | 12/2011 | Classon et al. | 370/329 |

FOREIGN PATENT DOCUMENTS

| | | |
|---|---|---|
| EP | 1581020 A1 | 9/2005 |
| KR | 10-2001-0093515 A | 10/2001 |

OTHER PUBLICATIONS

R3-061991 Random Access Procedure and Message Contents R2-061991 (3GPP TSG-RAN WG2 AH, Jun. 27-30, 2006) http://www.3gpp.org/index.php.*

TR 25.814 3GPP TR 25.814 v7.1.0 (Sep. 2006, Technical Specification Group Radio Access Network evolve UTRA release 7) http://www.3gpp.org/index.php.*

* cited by examiner

FDM

▨ : Control Signal Region

TDM

▨ : Control Signal Region

METHOD FOR TRANSMITTING CONTROL SIGNAL AND METHOD FOR ALLOCATING COMMUNICATION RESOURCE TO DO THE SAME

This application is the National Phase of PCT/KR2007/004850 filed on Oct. 4, 2007, which claims priority under 35 U.S.C. 119(e) to U.S. Provisional Application No. 60/828,097 filed on Oct. 4, 2006, and under 35 U.S.C. 119(a) to Patent Application No. 10-2006-0119888 filed in the Republic of Korea on Nov. 30, 2006, all of which are hereby expressly incorporated by reference into the present application.

FIELD OF INVENTION

The present invention relates to a wireless communication technology, and more particularly, to a method for transmitting a control signal together with RACH transmission and a method for allocation a communication resource for the control signal transmission.

DISCUSSION OF THE BACKGROUND ART

Generally, a random access channel (RACH) is a channel for a user equipment (hereinafter abbreviated UE) to perform downlink synchronization with a base station and for finding base station information. A position of a corresponding channel and the like can be obtained from base station information. And, an RACH can be accessed while a UE is not synchronized with a base station. The larger a cell size gets, the longer a length of the RACH becomes. It is a matter of course that the RACH is used for a UE to match uplink synchronization. And, it is also a matter of course that the RACH is a channel having collision probability.

Meanwhile, if data communication is being carried out between a base station and a random UE, the UE has to report a control signal such as ACK/NACK for transmitted packets, CQ informations for scheduling, TF (transmission format) information for uplink transmission and the like to the base station.

Yet, if RACH is inserted in the course of performing the above process and if the RACH uses an entire system band width, the UE is beset with a difficulty in transmitting a control signal to the base station. In particular, since an RACH length increases in proportion to a cell size, a delay time taken for the UE to send a control signal to a base station is increased.

THE LTE currently discusses a scheme for transmitting a control signal carried on a predetermined area after TTI has been discriminated by FDM and a method of selecting specific OFDM symbol(s) to use for a control signal as a scheme for transmitting the above-explained control signal such as ACK/NACK and the like. If there exists data to be transmitted, a scheme for transmitting a control signal together with the data is taken into consideration. Yet, it has not been discussed how to handle a case that RACH is interrupted in the course of uplink transmission.

FIG. 1A and FIG. 1B are diagrams for a scheme for transmitting a control signal by FDM or TDM according to a related art.

Referring to FIG. 1A, a control signal is transmitted in a manner that a resource region for a control signal transmission is allocated to a predetermined frequency band like the shaded region 'control signal region' shown in FIG. 1A within 1 TTI (transmission time interval) corresponding to a transmission unit resource region in LTE.

Referring to FIG. 1B, a control signal is transmitted in a manner that a resource region for a control signal transmission is allocated to a predetermined time domain like the shaded region 'control signal region' shown in FIG. 1B within 1 TTI.

FIG. 2 is a diagram for a case of transmitting RACH on a control signal transmission band.

Referring to FIG. 2, RACH is assigned in the course of transmitting an uplink control signal in case that a whole system band is used. In this case, since a UE is unable to use an uplink at all, it is not able to deliver a control signal. And, all communication protocols are delayed as long as a length of the RACH.

Meanwhile, even if RACH fails to occupy a whole system bandwidth, RACH transmission is frequently allocated to be simultaneously carried out on each frequency band. In this case, like the case of FIG. 2, there is a problem that an uplink control signal transmission is delayed as long as a length of the RACH.

Therefore, a technique for transmitting a control signal efficiently in a section for transmitting RACH is demanded.

SUMMARY OF THE INVENTION

Accordingly, the present invention is directed to a method for transmitting a control signal together with RACH transmission and a method for allocation a communication resource for the control signal transmission that substantially obviate one or more of the problems due to limitations and disadvantages of the related art.

An object of the present invention is to provide a method of transmitting a control signal and a method of allocating a communication resource for the same, by which the control signal can be efficiently transmitted without a delay for an interval where RACH is transmitted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in allocating a communication resource for a control signal transmission within a transmission unit resource region for performing an RACH transmission, a method for allocating a communication resource according to the present invention includes the steps of setting a resource region used for the RACH transmission to a portion of the transmission unit resource region and allocating a control signal transmission resource region unused for the RACH transmission within the transmission unit resource region.

Preferably, the control signal transmission resource region and the resource region used for the RACH transmission are discriminated from each other by frequency division multiplexing (FDM), and the control signal transmission resource region is allocated by any one scheme selected from among a first scheme for arranging the control signal transmission resource region at one side of a whole frequency band of the transmission unit resource region, a second scheme for arranging the control signal transmission resource region at both sides of the whole frequency band, and a third scheme for allocating the control signal transmission resource region by distributing the control signal transmission resource region within the whole frequency band.

More preferably, in a one communication system (hereinafter, 'first communication system') in which a frequency bandwidth of the resource region used for the RACH transmission is equal to a system frequency bandwidth, the control signal transmission resource region is allocated by either the first scheme or the second scheme. And, in another communication system (hereinafter, 'second communication system') in which the frequency bandwidth of the resource region used for the RACH transmission is smaller than the system frequency bandwidth, the control signal transmission resource region is allocated by the third scheme.

Preferably, the control signal transmission resource region and the resource region used for the RACH transmission are discriminated from each other by time division multiplexing (TDM), and the control signal transmission resource region is allocated by any one scheme selected among a first scheme for arranging the control signal transmission resource region at one side of a whole transmit time interval of the transmission unit resource region and a second scheme for arranging the control signal transmission resource region at both sides of the whole transmit time interval.

Preferably, the control signal transmission resource region and the resource region used for the RACH transmission are discriminated from each other by frequency division multiplexing (FDM) and time division multiplexing (TDM), the control signal transmission resource region is allocated in a whole frequency band of the transmission unit resource region by any one scheme selected a first scheme for arranging the control signal transmission resource region at one side of the whole frequency band, a second scheme for arranging the control signal transmission resource region at both sides of the whole frequency band, and a third scheme for allocating the control signal transmission resource region by distributing the control signal transmission resource region within the whole frequency band, and the control signal transmission resource region is allocated in a whole transmit time interval of the transmission unit resource region by any one scheme selected among a fourth scheme for arranging the control signal transmission resource region at one side of a whole transmit time interval of the transmission unit resource region and a fifth scheme for arranging the control signal transmission resource region at both sides of the whole transmit time interval.

Preferably, the control signal comprises at least one of ACK/NACK information, channel quality information and transmission format (TF) information.

To further achieve these and other advantages and in accordance with the purpose of the present invention, in allocating a communication resource for a control signal transmission within a transmission unit resource region for performing an RACH transmission, a method for allocating a communication resource according to the present invention includes the steps of allocating a sequence set for a random access and a sequence set for indicating a control signal and setting to transmit the control signal using the sequence set allocated to indicate the control signal within a resource region used for the RACH signal transmission.

Preferably, the sequence set allocating step includes the step of designating a usage of each sequence of the sequence set for indicating the control signal.

Preferably, the sequence set for indicating the control signal comprises a sequence of which a correlation value with any sequence comprised in the sequence set for the random access is equal to or smaller than a threshold.

More preferably, the sequence set for indicating the control signal and the sequence set for the random access are consisted of any one type of sequence selected among CAZAC sequence, Walsh sequence, and gold sequence.

Preferably, the sequence set for indicating the control signal does not include a sequence commonly comprised in the sequence for the random access.

Preferably, the control signal includes at least one of ACK/NACK information, channel quality information and transmission format (TF) information.

To further achieve these and other advantages and in accordance with the purpose of the present invention, in allocating a communication resource for a control signal transmission in a communication system enabling a plurality of RACH transmissions within a system frequency bandwidth, a method for allocating a communication resource according to the present invention includes the steps of setting each of a plurality of resource regions used for each of a plurality of the RACH transmissions to each of transmission unit time resource regions differing from each other per a unit frequency band and allocating a resource region for the control signal transmission to a resource region except the plurality of the resource regions used for the plurality of the RACH transmissions.

To further achieve these and other advantages and in accordance with the purpose of the present invention, in transmitting a control signal within a transmission unit resource region for performing an RACH transmission, a method for transmitting control signal according to the present invention includes the steps of obtaining allocation information of a resource region for the control signal unused for the RACH transmission within the transmission unit resource region and transmitting the control signal via the resource region allocated for the control signal.

To further achieve these and other advantages and in accordance with the purpose of the present invention, in transmitting a control signal within a transmission unit resource region for performing an RACH transmission, a method for transmitting control signal according to the present invention includes the steps of obtaining sequence set allocation information for indicating the control signal and transmitting a sequence indicating the control signal in the sequence set allocated for the control signal via a resource region used for the RACH signal transmission.

To further achieve these and other advantages and in accordance with the purpose of the present invention, in transmitting a control signal in a communication system enabling a plurality of RACH transmissions within a system frequency bandwidth, a method for transmitting control signal according to the present invention includes the steps of obtaining allocation information of a resource region for the control signal except a plurality of RACH resource regions used for a plurality of RACH transmissions and set to be transmitted to transmission unit time resource regions differing from each other per a unit frequency band and transmitting the control signal via the resource region allocated for the control signal.

It is to be understood that both the foregoing general description and the following detailed description are exemplary and explanatory and are intended to provide further explanation of the invention as claimed.

Accordingly, in a control signal transmitting method and a communication resource allocating method for the same according to one embodiment of the present invention, it is able to efficiently transmit a control signal in an interval where RACH is transmitted without a delay.

In particular, by setting a time-frequency domain for RACH transmission to a portion of a time-frequency domain of a whole system, in case that a control signal is carried by a resource region unused for the RACH transmission, a scheme for transmitting the control signal can be maintained intact in a region where RACH does not exist. Hence, it is advantageous that complexity of UE is not increased.

In case of a method of transmitting a control signal using RACH itself, i.e., in case that a UE transmits a control signal on RACH by CDM (code division multiplexing), a base station forwards sequence corresponding information to remove vagueness. And, a size of the RACH can be set largest.

Moreover, as an RACH transmission bandwidth is smaller than a whole system bandwidth, if a plurality of RACHs are transmittable within the whole system bandwidth, in a scheme of transmitting the RACHs for different frames in accordance with frequency bands, respectively, an RACH size can be maintained intact. Besides, an additional sequence allocation is no requested, an RACH re-access period of UE is shortened, and frequency axis diversity can be obtained.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
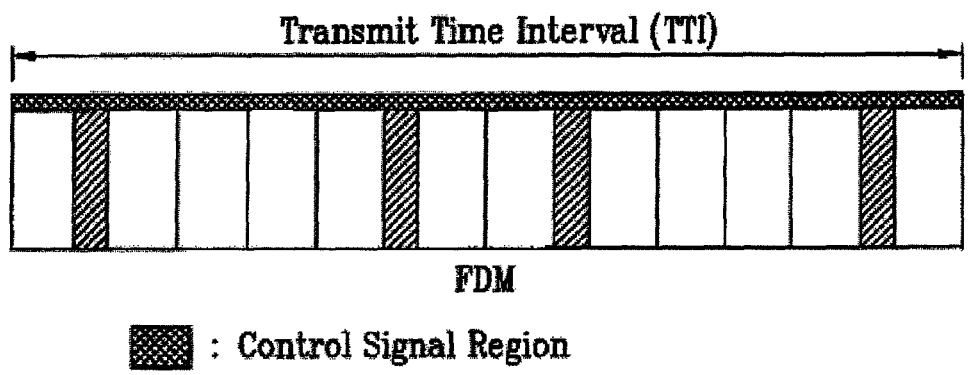
FIG. 1A and FIG. 1B are diagrams for a scheme for transmitting a control signal by FDM or TDM according to a related art.
Figure 1B:
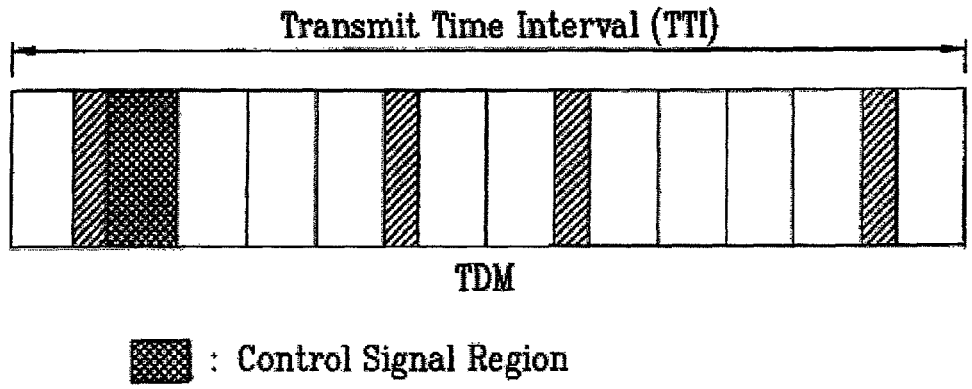

Reference will now be made in detail to the preferred embodiments of the present invention, examples of which are illustrated in the accompanying drawings. In the following description, details are included to help complete understanding of the present invention. Yet, it is apparent to those skilled in the art that the present invention can be implemented without those details. For clarity of the concept of the present invention, the well-known structures and devices are omitted or illustrated as block diagrams for core functions of the respective structures and devices. Wherever possible, the same reference numbers will be used throughout the drawings to refer to the same or like parts.

In case that a system bandwidth is small, a space occupied by an RACH can be a length enough to give a UE a delay on communication. Under the circumstance, if a control signal is designed without considering an RACH transmission, there occurs a problem that a UE has a longer data delay time.

Moreover, even if a system bandwidth is large enough, if RACH transmission is carried out for a same frame as like the related art, there also occurs the same problem as the case of the small system bandwidth in that a control signal transmission is delayed.

Accordingly, the present invention proposes a scheme for setting a resource region used for RACH transmission to a portion of 1TTI to transmit a control signal without a delay despite the RACH transmission, a scheme for transmitting a control signal via RACH itself, a scheme for transmitting a control signal without a delay in a manner of arranging transmission time regions for RACH transmissions in different frames in case that a plurality of RACH transmissions are possible within a system bandwidth in case that an RACH transmission bandwidth is smaller than a whole system bandwidth, and the like.

Generally, in case that an RACH transmission exists in the middle of a communication between a UE and a base station, the following schemes can be considered as a method for processing a control signal.

In a first scheme, UEs having communicated with a base station simply stop all control signal deliveries during an RACH interval. Namely, after completion of RACH, control signals are delivered. In this case, a UE undergoes a delay on communication protocol overall. This means the related art scheme shown in FIG. 2.

In a second scheme, allocation of RACH is not carried out on a whole time/frequency domain of a system to leave the time/frequency domain in part. In this case, a remaining space is usable for control signal transmission. In case of frequency division multiplexing (FDM), the second scheme means a scheme for performing allocation making a bandwidth of RACH smaller than a system bandwidth. In case of time division multiplexing (TDM), the second scheme means a scheme for setting a length of RACH smaller than a TTI unit. Thus, even if RACH is allocated in the middle, it is advantageous that UEs can keep forwarding control signals to the base station.

In a third scheme, a control signal is transmitted using RACH itself by allowing RACH allocation to use a whole time/frequency domain of system. In case that RACH allocation is carried out on a whole time-frequency domain, there is no way for a UE to deliver a control signal except using RACH space itself. So, the UE has to transmit the control signal through the RACH without waiting for a next resource allocation.

Thus, in order to transmit a control signal via RACH, a separate mechanism is required.

In a fourth scheme, as a frequency bandwidth for an RACH transmission is smaller than a system frequency bandwidth, if a plurality of RACH transmissions are possible within a whole bandwidth, resource regions used for a plurality of the RACH transmissions are set to be transmitted for different frames instead of transmitting a plurality of RACHs for a same frame like the related art. In this case, since a plurality of the RACH transmissions are carried out for the different frames, respectively, it is able to transmit a control signal without a delay in a manner of transmitting the control signal via a resource region where an RACH is not transmitted.

The rest of the above schemes except the first scheme are explained in detail as follows.

The most advantageous thing of the second scheme among the above-explained schemes lies in that UEs attempting to access RACH can have an opportunity to use more sequences without giving additional interference to the UEs since a UE does not use RACH region to transmit a control signal.

Figure 3A:
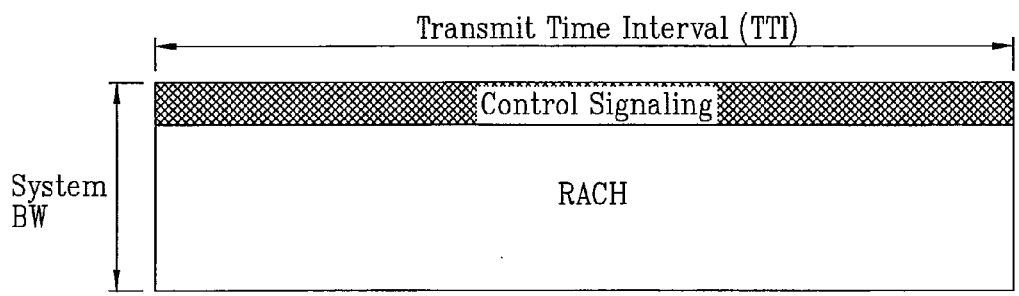
FIGS. 3A to 3C are diagrams for explaining a method of transmitting a control signal within 1 TTI frame for transmitting RACH by FDM according to one embodiment of the present invention.
Figure 3B:
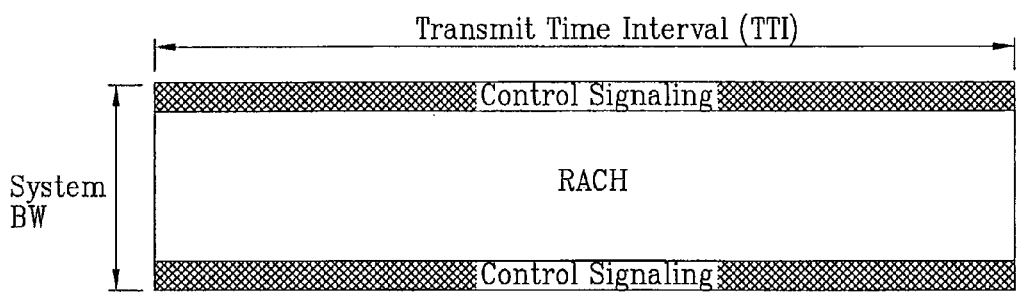
Figure 3C:
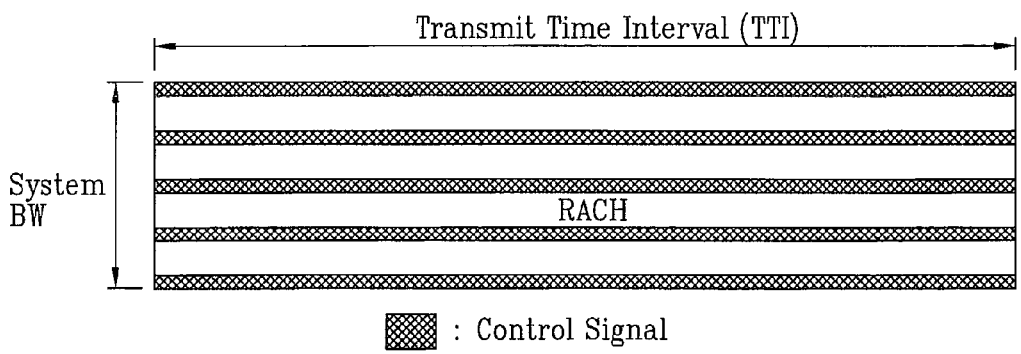

FIGS. 3A to 3C are diagrams for explaining a method of transmitting a control signal within 1 TTI frame for transmitting RACH by FDM according to one embodiment of the present invention.

FIG. 3A shows a scheme in which a region for a control signal transmission is located at a predetermined one side of a whole system frequency band, FIG. 3B shows a scheme in which a region for a control signal transmission is located at both sides of a whole system frequency band, and FIG. 3C shows a scheme in which a region for a control signal transmission is distributed within a whole system frequency band.

A case of transmission by the scheme shown in FIG. 3A or FIG. 3B is advantageous in that a control signal can be transmitted without affecting RACH or being affected by the RACH. In particular, this case is useful for a case that a single RACH is transmitted.

On the other hand, in case that an RACH and a channel for a control signal transmission are iteratively arranged, a plurality of RACHs are defined within a whole system bandwidth. So, a channel for a control signal transmission can be inserted in-between.

Meanwhile, multiplexing between a control signal and RACH can be accomplished by TDM as well as FDM.

Figure 4A:
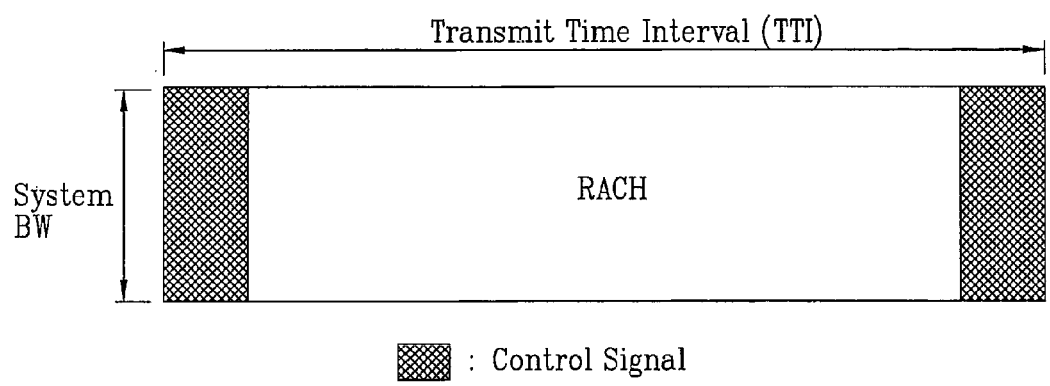
FIG. 4A and FIG. 4B are diagrams for explaining a method of transmitting a control signal within 1 TTI frame for transmitting RACH by TDM according to one embodiment of the present invention.
Figure 4B:
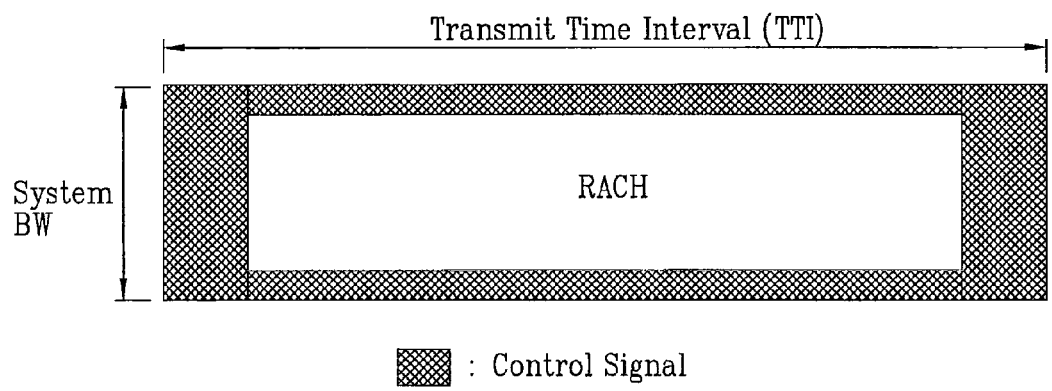

FIG. 4A and FIG. 4B are diagrams for explaining a method of transmitting a control signal within 1 TTI frame for transmitting RACH by TDM according to one embodiment of the present invention.

FIG. 4A shows an allocation scheme in a manner of discriminating RACH and a control signal portion from each other by TDM.

Since it is appropriate that RACH is continuously allocated on a time axis, portions for control signal transmission can be placed at a head and a tail of 1TTI or like, respectively. Alternatively, both of the portions for control signal transmission can be allocated to both head and tail of 1TTI together.

If a control signal is placed at a front portion, a base station will be enabled to prepare for a work to do in the next TTI with reference to the control signal. And, a control channel placed at a rear portion enables a base station to use the latest CQ information or the like.

Yet, if a control signal is transmitted by the scheme shown in FIG. 4A, limitation may be put on a transmission power that is used by a UE within a predetermined time. So, a coverage problem may arise.

Hence, an implementation scheme by considering both TDM and FDM structures shown in FIG. 4B can be more useful. In particular, a control signal can be set to be transmitted by FDM considering a coverage. For example, control information of a UE existing in the vicinity of a base station can be set to be transmitted by FDM. And control information having moderate coverage problem can be set to be transmitted by TDM.

FIG. 4B shows an example of allocating control signal transmission regions to both sides of a whole system bandwidth by FDM, respectively and setting control signal transmit time intervals at front and rear end portions of a whole TTI by TDM, respectively. Yet, embodiments of the present invention are not restricted by FIG. 4B. As long as using both FDM and TDM simultaneously in a manner of setting a control signal considering a coverage to be transmitted by FDM and setting a control signal having a non-serious coverage problem to be transmitted by TDM. FDM is carried out by one of the schemes as shown in FIG. 3A and FIG. 3B and a control signal transmit time interval can be allocated to one or both sides of a whole 1 TTI by TDM.

Meanwhile, as a method of transmitting a control signal, the schemes shown in FIGS. 3A to 3C, FIG. 4A and FIG. 4B are applicable to a general TTI frame corresponding to a case of failing to be multiplexed with RACH, i.e., to a case of not transmitting RACH. In other words, a portion indicated by RACH in one of the schemes shown in FIGS. 3A to 3C, FIG. 4A and FIG. 4B can be filled with other data information or control signal information.

As mentioned in the foregoing description, when a resource region for a control signal transmission is structurally constructed in association with FIGS. 3A to 4B, a base station enables a UE to transmit a corresponding control signal via scheduling for the resources in downlink. And, this structure is applicable to both a case of a RACH presence and a case of a RACH non-presence. Hence, it is advantageous that it is unnecessary to give an additional operation option to a UE.

In this following description, as a method of enabling a control signal to be transmitted in a situation that an RACH is transmitted, the third scheme among the above-explained schemes, i.e., the scheme for using the RACH region itself for the control signal transmission is explained.

Figure 2:
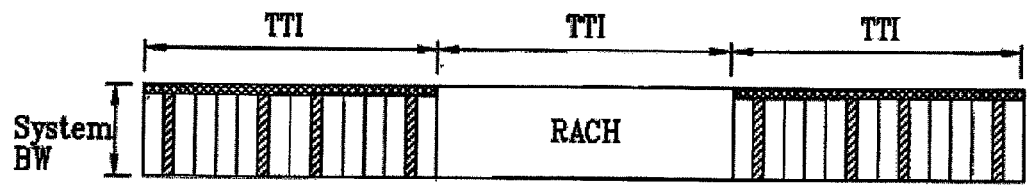
FIG. 2 is a diagram for a case of transmitting RACH on a control signal transmission band.

In case that an RACH entirely uses a corresponding TTI resource and in case that a control signal is transmitted using the RACH itself without a separate resource region allocation for a control signal transmission, a corresponding multiplexing structure is as shown in FIG. 2.

Yet, one embodiment of the present invention proposes a scheme for setting a control signal to be discriminated from RACH signals through RACH transmission region by CDM. In particular, a sequence set to be used in the RACH region can be discriminated into a sequence set for a control signal and a sequence set for a random access. In case that a UE needs to transmit a control signal, a base station forwards it to a corresponding UE in a manner of discriminating which sequence will be used for a prescribed usage.

So, the UE forwards the control signal by transmitting a corresponding sequence on RACH in accordance with its situation. In doing so, since the sequence used by the UE should have minimum influence on a random access signal, it is preferable that a signal having a very small correlation in-between is used. For this, CAZAC series sequence for guaranteeing orthogonality, Walsh, gold sequence having good correlation characteristics, and the like are available.

Meanwhile, when a sequence set usable for RACH is represented as 'Cell specific RACH sequence set={Random access sequence set (Sra), Control signal sequence set (Scs)}', if Sra and Scs do not include a common sequence, it is preferable that a base station is able to remove vagueness attributed to a random access in detecting an RACH signal. Yet, if a random access probability is small and if the number of allocated sequences is enough, the Sra and the Scs can be defined as a sequence set including a common sequence.

Thus, if there exists a UE that needs to forward control information on an interval to which RACH is allocated, a base station defines a specific sequence set from the Scs to enable the UE to select and report a sequence indicating a control signal according to its situation from the Scs.

For instance, a case of transmitting ACK/NACK in an interval for transmitting RACH is taken into consideration as follows.

Figure 5:
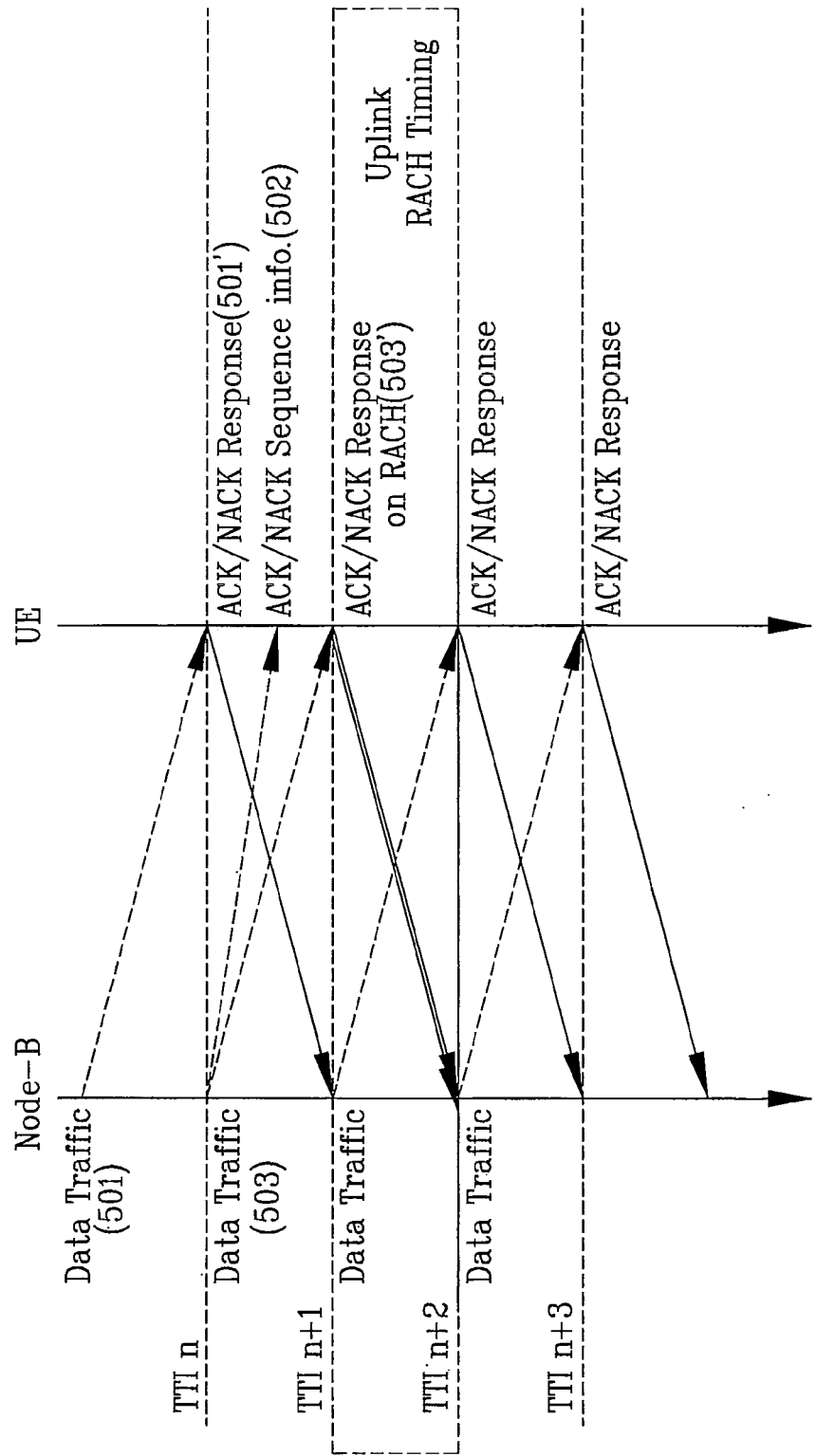
FIG. 5 is a diagram for an example of transmitting a control signal via RACH and an RACH signal by CDM according to one embodiment of the present invention, in which a method of transmitting ACK/NACK signal via RACH is shown.

FIG. 5 is a diagram for an example of transmitting a control signal via RACH and an RACH signal by CDM according to one embodiment of the present invention, in which a method of transmitting ACK/NACK signal via RACH is shown.

First of all, if a base station (Node-B) transmits a data traffic 501 to a UE for TTI n, the UE transmits an ACK/NACK signal 501' for the data traffic received for TTI n+1. In this case, if it is estimated that RACH will be transmitted for TTI n+2 ('Uplink RACH Timing' shown in FIG. 5), the base station forwards sequence information (ACK/NACK Sequence Info. 502) for indicating the ACK/NACK signal to the UE in downlink. The sequence information 502 can include information on a sequence set including two sequences available for indicating ACK/NACK and information on which one of the sequences will indicate either ACK or NACK.

Subsequently, for a data traffic 503 the base station transmits to the UE for TTI n+1, the UE selects the sequence corresponding to the ACK or the sequence corresponding to the NACK from the ACK and the NACK in accordance with information the UE attempts to transmit and then transmits a signal 503' via the RACH for TTI n+2 for transmitting the RACH. If so, the base station is able to extract the control signal information transmitted by the UE by searching the corresponding sequences. Thereafter, for TTI n+3 for which no RACH transmission is carried out, ACK/NACK information transmission can be carried out in the same manner for the TTI n and the TTI n+1.

As mentioned in the foregoing description, according to one embodiment of the present invention, proposed is a method of transmitting control information such as ACK and NACK through a radio resource separately allocated for control information such as a separate control channel (e.g., AICH (acknowledgement indication channel) and the like if RACH does not exist or transmitting ACK/NACK (control information) via RACH if there exists the RACH.

As mentioned in the foregoing description, the scheme for transmitting the control signal via the RACH can be set to discriminate a random access UE accessing the RACH from a UE transmitting different control information by CDM.

As a method of enabling a control signal to be transmitted in a situation that RACH is transmitted, the fourth scheme among the above proposed schemes, i.e., a method of setting RACH transmission to be performed in different frames for control signal transmission when a bandwidth used for RACH is smaller than a whole system bandwidth is explained as follows.

Figure 6:
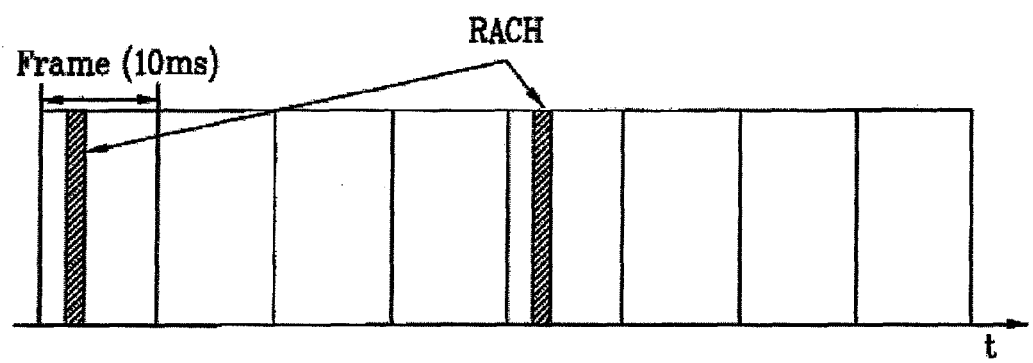
FIG. 6 is a diagram for explaining a method of transmitting RACH according to a related art in case that a system bandwidth is greater than a bandwidth for RACH transmission.

FIG. 6 is a diagram for explaining a method of transmitting RACH according to a related art in case that a system bandwidth is greater than a bandwidth for RACH transmission.

A related art RACH does not propose a clear structure on a frequency axis or a time axis. Yet, it can be approximately estimated as a burst type structure shown in FIG. 6.

Yet, if a UE fails in accessing an RACH of a specific frame (e.g., first frame shown in FIG. 6), the burst type arises a problem that a considerable time should be awaited until an RACH assigned to a frame of a next period (e.g., fifth frame shown in FIG. 6) appears. Namely, if a UE fails in an RACH access, an interval to a retrial is elongated.

In case that channel features of a frequency band selected from RACH are poor, it becomes highly probable that an access to RACH fails. Yet, the burst type RACH does not give a UE an opportunity for selecting various frequencies.

To solve the above-mentioned problems, 'Data transmitting method via random access channel (Korean Patent Application No. 2006-52167: hereinafter called 'applied invention No. 52167')' invented by the present inventor and applied by the present applicant teaches a method of transmitting data via RACH, which enables an access to an RACH of a next frame by arranging RACH in a different position for each frame instead of arranging RACH in burst if a UE fails in an RACH access.

As mentioned in the foregoing description of the related art in this disclosure, when an RACH transmission bandwidth is smaller than a system bandwidth, if RACH is transmitted by the scheme shown in FIG. 6, there arises a problem that a control signal is not transmittable for a time of transmitting the RACH as well as the aforesaid problems.

Hence, according to one embodiment of the present invention, instead of arranging RACH in the same frame in a manner similar to that of the applied invention No. 52167, RACH is arranged differently per frame in accordance with each frequency domain. Thus, a method of transmitting a control signal via a region where RACH is not arranged is proposed.

Figure 7:
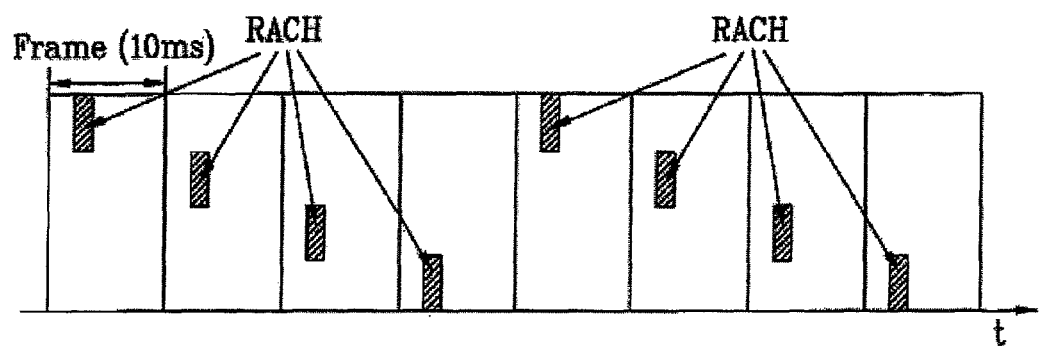
FIG. 7 is a diagram for explaining a method of transmitting a control signal according to one embodiment of the present invention in case that an RACH transmission bandwidth is set different per a frequency band for each frame.

FIG. 7 is a diagram for explaining a method of transmitting a control signal according to one embodiment of the present invention in case that an RACH transmission bandwidth is set different per a frequency band for each frame.

Referring to FIG. 7, in case that a plurality of RACH transmissions are possible within a whole system bandwidth, an interval for transmitting RACH is set to a frame differing per a frequency band to transmit the RACH. So, each frame can have a redundant resource region for control signal transmission. If a corresponding control signal is transmitted through the redundant resource region, it is able to prevent a control signal transmission delay due to the RACH transmission.

FIG. 7 shows an example that RACH is repeatedly arranged in a manner that a period for arranging RACH differently per a frequency band is set to four frames. Yet, according to one embodiment of the present invention, as long as a redundant resource region for a control signal transmission is allowed for each frame, a pattern for arranging RACH transmission needs not to be limited to a specific pattern.

Yet, in case of the arrangement form shown in FIG. 7, it is able to simplify an RACH arrangement pattern. If each frequency domain has a uniform RACH distribution, as shown in FIG. 7, it is preferable that a higher frequency diversity gain can be obtained.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, in a control signal transmitting method and a communication resource allocating method for the same according to one embodiment of the present invention, it is able to efficiently transmit a control signal in an interval where RACH is transmitted without a delay.

In particular, by setting a time-frequency domain for RACH transmission to a portion of a time-frequency domain of a whole system, in case that a control signal is carried by a resource region unused for the RACH transmission, a scheme for transmitting the control signal can be maintained intact in a region where RACH does not exist. Hence, it is advantageous that complexity of UE is not increased.

In case of a method of transmitting a control signal using RACH itself, i.e., in case that a UE transmits a control signal on RACH by CDM, a base station forwards corresponding sequence information to remove vagueness. And, a size of the RACH can be set largest.

Moreover, as an RACH transmission bandwidth is smaller than a whole system bandwidth, if a plurality of RACHs are transmittable within the whole system bandwidth, in a scheme of transmitting the RACHs for different frames in accordance with frequency bands, respectively, an RACH size can be maintained intact. Besides, an additional sequence allocation is no requested, an RACH re-access period of UE is shortened, and frequency axis diversity can be obtained.

The present invention is applicable to any communication system capable of transmitting a random access channel and a control signal simultaneously as well as to 3GPP LTE system.

What is claimed is:

1. A method for allocating communication resource for control signal transmission within a transmission unit resource region for a random access channel (RACH) signal transmission, the method comprising:
    configuring a user equipment with a RACH resource region for the RACH signal transmission, wherein the RACH resource region is specified by a time domain region and a frequency domain region;
    allocating a first sequence set used only for a random access and a second sequence set used only for a control signal to the user equipment,
    wherein the first sequence set includes at least one sequence for indicating the random access and the second sequence set includes at least one sequence for indicating the control signal, and the first sequence set is discriminated from the second sequence set by code division multiplexing; and
    receiving a sequence selected by the user equipment from the user equipment,
    wherein the selected sequence belongs to either the first sequence set or the second sequence set,
    wherein, if the selected sequence belongs to the first sequence set, the RACH signal is transmitted by the user equipment by transmitting, within the time domain region and the frequency domain region configured as the RACH resource region, a sequence selected from the first sequence set,
    wherein, if the selected sequence belongs to the second sequence set, the control signal is transmitted by the user equipment by transmitting, within the same time domain region and the same frequency domain region as the RACH resource region, a sequence selected from the second sequence set, and
    wherein the control signal includes channel quality information.

2. The method of claim 1, wherein the allocating the first sequence set and the second sequence set comprises:
    designating a usage of each sequence of the second sequence set.

3. The method of claim 1, wherein a correlation value between the at least one sequence of the first sequence set and the at least one sequence of the second sequence set is equal to or smaller than a threshold.

4. The method of claim 3, wherein the first sequence set and the second sequence set comprise one of a CAZAC sequence, a Walsh sequence, and a gold sequence.

5. The method of claim 1, wherein the control signal further comprises:
    at least one of ACK/NACK information and transmission format (TF) information.

6. A method for transmitting a control signal within a transmission unit resource region for a random access channel (RACH) signal transmission, the method comprising:
    receiving configuration information configuring a user equipment with a RACH resource region for the RACH signal transmission, wherein the RACH resource region is specified by a time domain region and a frequency domain region;
    obtaining sequence set allocation information allocating a first sequence set used only for a random access and a second sequence set used only for a control signal to the user equipment,
    wherein the first sequence set includes at least one sequence for indicating the random access and the second sequence set includes at least one sequence for indicating the control signal, and the first sequence set is discriminated from the second sequence set by code division multiplexing;
    selecting a sequence,
    wherein the selected sequence belongs to either the first sequence set or the second sequence set; and
    transmitting the selected sequence,
    wherein, if the selected sequence belongs to the first sequence set, the RACH signal is transmitted by the user equipment by transmitting, within the time domain region and the frequency domain region configured as the RACH resource region, a sequence selected from the first sequence set,
    wherein, if the selected sequence belongs to the second sequence set, the control signal is transmitted by the user equipment by transmitting, within the same time domain region and the same frequency domain region as the RACH resource region, a sequence selected from the second sequence set, and
    wherein the control signal includes channel quality information.

7. The method of claim 6, wherein a usage of each sequence of the second sequence set is pre-designated.

8. The method of claim 6, wherein a correlation value between the at least one sequence of the first sequence set and the at least one sequence of the second sequence set is equal to or smaller than a threshold.

9. The method of claim 8, wherein the first sequence set and the second sequence set comprise one of a CAZAC sequence, a Walsh sequence, and a gold sequence.

10. The method of claim 6, wherein the control signal further comprises:
    at least one of ACK/NACK information and transmission format (TF) information.

* * * * *